United States Patent
Lai

(10) Patent No.: US 12,130,154 B2
(45) Date of Patent: Oct. 29, 2024

(54) AUTOMATIC ELECTRONIC RANGEFINDER

(71) Applicant: TOP MEASURE INSTRUMENT COMPANY, Taichung (TW)

(72) Inventor: Yin-Wu Lai, Taichung (TW)

(73) Assignee: TOP MEASURE INSTRUMENT COMPANY, Taichung (TW)

( * ) Notice: Subject to any disclaimer, the term of this patent is extended or adjusted under 35 U.S.C. 154(b) by 986 days.

(21) Appl. No.: 16/591,597

(22) Filed: Oct. 2, 2019

(65) Prior Publication Data
US 2021/0102804 A1    Apr. 8, 2021

(51) Int. Cl.
*G01C 3/08*    (2006.01)
*G01C 1/00*    (2006.01)
(Continued)

(52) U.S. Cl.
CPC .............. *G01C 3/08* (2013.01); *G01C 1/00* (2013.01); *G01S 7/4804* (2013.01); *G01S 7/481* (2013.01);
(Continued)

(58) Field of Classification Search
CPC ...... G01S 17/931; G01S 17/86; G01S 7/4804; G01S 7/481; G01S 7/4817; G01S 7/484;
(Continued)

(56) References Cited

U.S. PATENT DOCUMENTS 8,094,291 B2 * 1/2012 Zimmermann ......... G01S 17/08
356/4.01
9,798,005 B2 * 10/2017 Cho ..................... G01S 7/4817
(Continued)

FOREIGN PATENT DOCUMENTS

CN          104913763 B  * 10/2017  ............. G01C 11/02
DE     102017215783 A1 *  3/2019  ............. G01B 11/14
(Continued)

OTHER PUBLICATIONS

Carter, Jamie et al., "Lidar 101: An Introduction to Lidar Technology, Data, and Applications", Nov. 2012, NOAA Coastal Services Center, p. 3, "What is Lidar?" (Year: 2012).*
(Continued)

*Primary Examiner* — Yuqing Xiao
*Assistant Examiner* — Jempson Noel
(74) *Attorney, Agent, or Firm* — PAI PATENT & TRADEMARK LAW FIRM; Chao-Chang David Pai

(57) ABSTRACT

An automatic electronic rangefinder has a central processing unit determining whether the rangefinder is perpendicular or parallel to a horizontal plane; a ranging module electrically connected to the central processing unit to detect the distance to a first target object to be measured; an inertial sensing unit electrically connected to the central processing unit to measure the angle between the lengthwise edge of the rangefinder and the horizontal plane; and a shell covering the central processing unit. When the central processing unit determines that the rangefinder is parallel or perpendicular to the horizontal plane, the central processing unit controls the ranging module to measure the distance between the rangefinder and the first target object.

17 Claims, 5 Drawing Sheets

(51) Int. Cl.
| | |
|---|---|
| *G01S 7/48* | (2006.01) |
| *G01S 7/481* | (2006.01) |
| *G01S 7/484* | (2006.01) |
| *G01S 7/4865* | (2020.01) |
| *G01S 17/08* | (2006.01) |
| *G01S 17/86* | (2020.01) |
| *G01S 17/88* | (2006.01) |
| *G01S 17/931* | (2020.01) |

(52) U.S. Cl.
CPC ............ *G01S 7/4817* (2013.01); *G01S 7/484* (2013.01); *G01S 7/4865* (2013.01); *G01S 17/08* (2013.01); *G01S 17/86* (2020.01); *G01S 17/88* (2013.01); *G01S 17/931* (2020.01)

(58) Field of Classification Search
CPC ........ G01S 7/4865; G01S 17/08; G01S 17/88; G01C 3/08; G01C 1/00; G01C 3/00
USPC ........................................................ 356/5.01
See application file for complete search history.

(56) References Cited

U.S. PATENT DOCUMENTS

| | | | | |
|---|---|---|---|---|
| 11,181,379 B2* | 11/2021 | Babu | .................. | H04L 67/12 |
| 2011/0120438 A1* | 5/2011 | Samuels | ................ | F41G 1/473 |
| | | | | 124/87 |
| 2014/0378184 A1* | 12/2014 | Thorat | .............. | H04M 1/72403 |
| | | | | 455/556.1 |
| 2015/0204976 A1* | 7/2015 | Bosch | .................... | G01S 17/86 |
| | | | | 356/4.01 |
| 2017/0168160 A1* | 6/2017 | Metzler | .................. | G01S 17/86 |
| 2019/0107392 A1* | 4/2019 | Bösch | .................... | G01S 17/08 |
| 2019/0154439 A1* | 5/2019 | Binder | .................. | G01B 11/26 |

FOREIGN PATENT DOCUMENTS

| | | | | |
|---|---|---|---|---|
| EP | 1497615 B1 * | 8/2012 | .............. | G01C 3/08 |
| EP | 3336487 A1 * | 6/2018 | | |
| EP | 3467541 A1 * | 4/2019 | .............. | G01C 3/08 |
| KR | 10-1572782 B1 | 11/2015 | | |
| KR | 10-1596626 B1 | 2/2016 | | |

OTHER PUBLICATIONS

Meguro, Takayuki et al., "An angle sensor with a laser rangefinder", Dec. 1, 2011, Japan Society of Mechanical Engineers, Abstract (Year: 2011).*
Whyte, Refael et al., "Application of lidar techniques to time-of-flight range imagine", Nov. 20, 2015, Optica Publishing Group, Abstract (Year: 2015).*
"How does a laser speed gun work to measure a car's speed?" Jun. 7, 2000. HowStuffWorks.com (Year: 2000).*
Citation information for HowStuffWorks.com article (Used solely to establish publishing date) (Year: 2000).*
Machine translation of EP 3467541 A1 (Year: 2019).*
Machine translation of DE 102017215783 A1 (Year: 2019).*
Machine translation of CN 104913763 B (Year: 2017).*
Machine translation of EP 3336487 A1 (Year: 2018).*
Machine translation of EP 1497615 B1 (Year: 2012).*

* cited by examiner

AUTOMATIC ELECTRONIC RANGEFINDER

BACKGROUND OF THE INVENTION

1. Field of the Invention

The present invention relates to a rangefinder, more particularly to a rangefinder with an inertial sensing unit for automatically measuring a distance relative to an object.

2. Description of the Related Art

One of the existing ways to measure the distance between two objects is using an electronic rangefinder. The user holds an electronic rangefinder towards a target object to be measured, and manually presses the key on the electronic rangefinder, so that the electronic rangefinder emits a laser light to the target object. The target object reflects the laser light. The rangefinder receives the laser light reflected by the target object and compares the wavelength phase difference between the emitted laser light and the reflected laser light. Alternatively, the rangefinder compares the travel time difference between the emitted and reflected laser lights. According to comparison results, the rangefinder calculates a relative distance to the target object.

In order to more precisely measure the distance of the target object, the electronic rangefinder may first emit a red indicative light to the target object before the measurement. A red dot will be displayed on the target object, which allows the user to observe the direction to which the electronic rangefinder aims. The use of the red indicative light avoids measurement errors.

Because the travel distance of the laser light is longer than the length of the tape measure, the rangefinder could measure a relatively farther distance of the target object. Besides, because the existing rangefinder is simple and convenient to use, it gradually replaces the traditional tape measure and other measuring tools.

Although the existing electronic rangefinder can emit the indicative light to the target object before the measurement, allowing the user to determine whether the electronic rangefinder correctly points to the target object, the user must manually press the key on the electronic rangefinder at the actual measurement to activate the electronic rangefinder to emit laser light. Yet upon the manual pressing on the key, the electronic rangefinder may slightly shake. The electronic rangefinder may accordingly aim to an incorrect position, causing measurement errors. Usually, the user can hardly press the key steadily. The shake resulted from the user's operation will affect the measurement accuracy of the electronic rangefinder.

SUMMARY OF THE INVENTION

The present invention provides an automatic electronic rangefinder that automatically measures the angle between the rangefinder and a horizontal plane when the rangefinder is aiming at the correct target object. The rangefinder measures a distance between the target object and the rangefinder when the horizontal angle meets a default angle value. It can avoid measurement error caused by hand shake.

The automatic electronic rangefinder comprises:
a central processing unit determining whether the rangefinder is perpendicular or parallel to the horizontal plane;
a ranging module electrically connected to the central processing unit to detect the distance of a first target object to be measured;
an inertial sensing unit electrically connected to the central processing unit to measure the angle between the lengthwise edge of the rangefinder and the horizontal plane;
a shell covering the central processing unit, the ranging module and the inertial sensing unit;
when the central processing unit determines that the rangefinder is parallel or perpendicular to the horizontal plane, the central processing unit controls the ranging module measuring the distance between the rangefinder and the first target object.

The present invention measures the angle between the rangefinder and the horizontal plane at any time by the inertial sensing unit. The rangefinder automatically emits a first detection wave when the angle between the rangefinder and the horizontal plane conforms to the default angle value. The rangefinder then receives the reflected first detection wave. The rangefinder compares the phase difference between the wavelengths of the emitted and reflected laser lights. Alternatively, the rangefinder compares the travel time difference between the emitted and reflected laser lights. The user does not have to manually press the key to carry out distance measurement. The user only needs to shake the rangefinder to adjust the angle between the electronic rangefinder and horizontal plane until the angle conforms to the default angle value. At the moment when the angle conforms to the default angle value, the first detection wave is emitted. It can avoid the user's handshake upon pressing the key and the first detection wave's deviation from the first target object. Thereby, the distance of the first target object can be measured more accurately.

Besides, the first light transmitter is mounted at a position opposite the first light receiver, and the second light transmitter is mounted at a position opposite the second light receiver. The present invention can further measure the distance between the first target object and the second target object at the same time. The user does not have to move to one of the target objects to measure the distance from the other target object when the rangefinder only has the first light transmitter and the first light receiver, thereby facilitating convenience in use.

Further, when the angle between the electronic automatic rangefinder and the horizontal plane is in an angle tolerance range, the central processing unit determines that the rangefinder is perpendicular or parallel to the horizontal plane. Thus the user does not need to control the angle between the rangefinder and the horizontal plane very precisely. The user only needs to adjust the angle between the rangefinder and the ground within the angle tolerance range. The central processing unit then can control the range module to measure the distance of the first target object. The user does not have to spend a lot of time fine-tuning the angle between the rangefinder and the horizontal plane, and can still maintain the measurement accuracy.

DETAILED DESCRIPTION OF THE INVENTION

Figure 1:
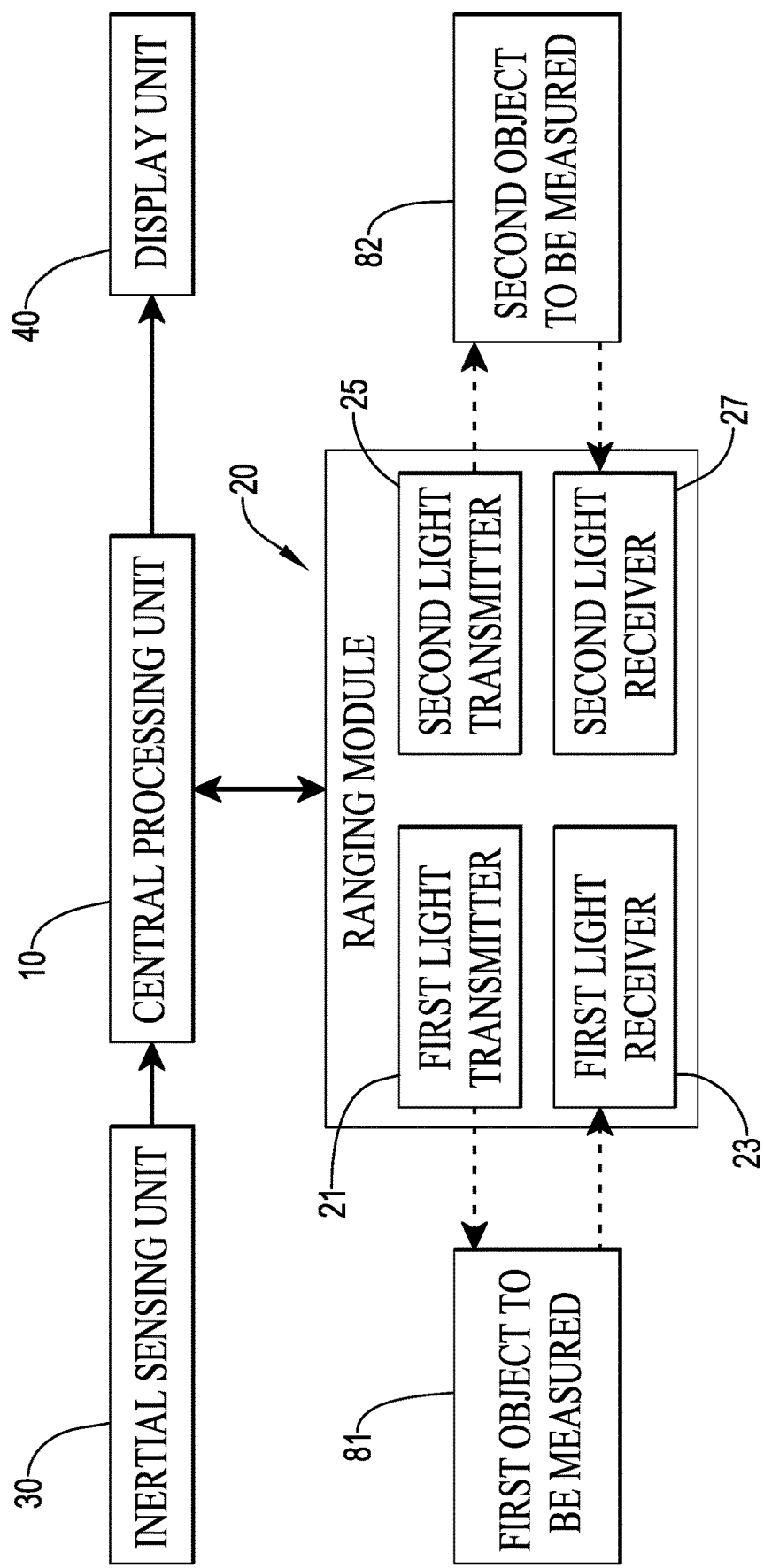
FIG. 1 is a circuit block diagram of an automatic electronic rangefinder of the present invention.
Figure 2:
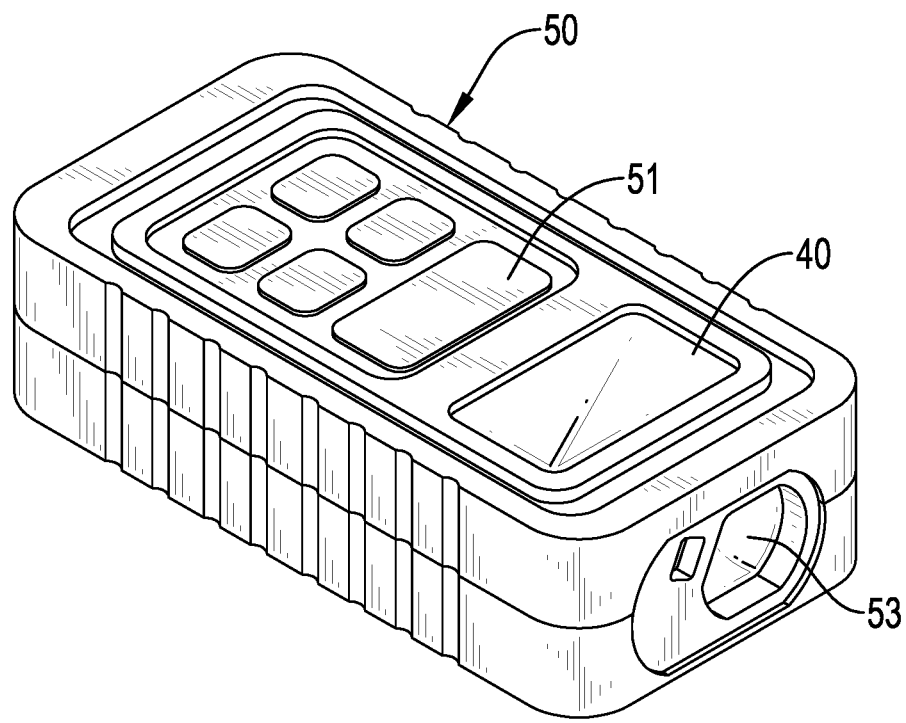
FIG. 2 is a perspective view of the first preferred embodiment of the present invention.

With reference to FIGS. 1 and 2, an automatic electronic rangefinder (hereinafter rangefinder) of the present invention can be held by the user and is able to sustain slight shaking. The rangefinder automatically activates a measurement function to measure a relative distance to a target object to be measured when the rangefinder is perpendicular to or parallel to a horizontal plane to avoid measurement inaccuracy. The rangefinder of the present invention comprises a central processing unit 10, a ranging module 20, an inertial sensing unit 30 and a shell 50.

The central processing unit 10 determines an angle between a lengthwise edge of the rangefinder and a horizontal plane. The central processing unit 10 activates a distance measuring function when the angle between the rangefinder and the horizontal plane conforms to a default angle value. The default angle value is preset in the central processing unit 10. For example, when the default angle value is set at 90 degrees, the rangefinder can activate the distance measuring function when the rangefinder is perpendicular to the ground. When the default angle value is set at 0 degree, the rangefinder can activate the distance measuring function when the rangefinder is parallel to the ground. The default angle value can be set at any other value, for example, +30 or −30 degrees relative to the horizontal plane. In the following description, the ground is used as the horizontal plane.

Figure 4:
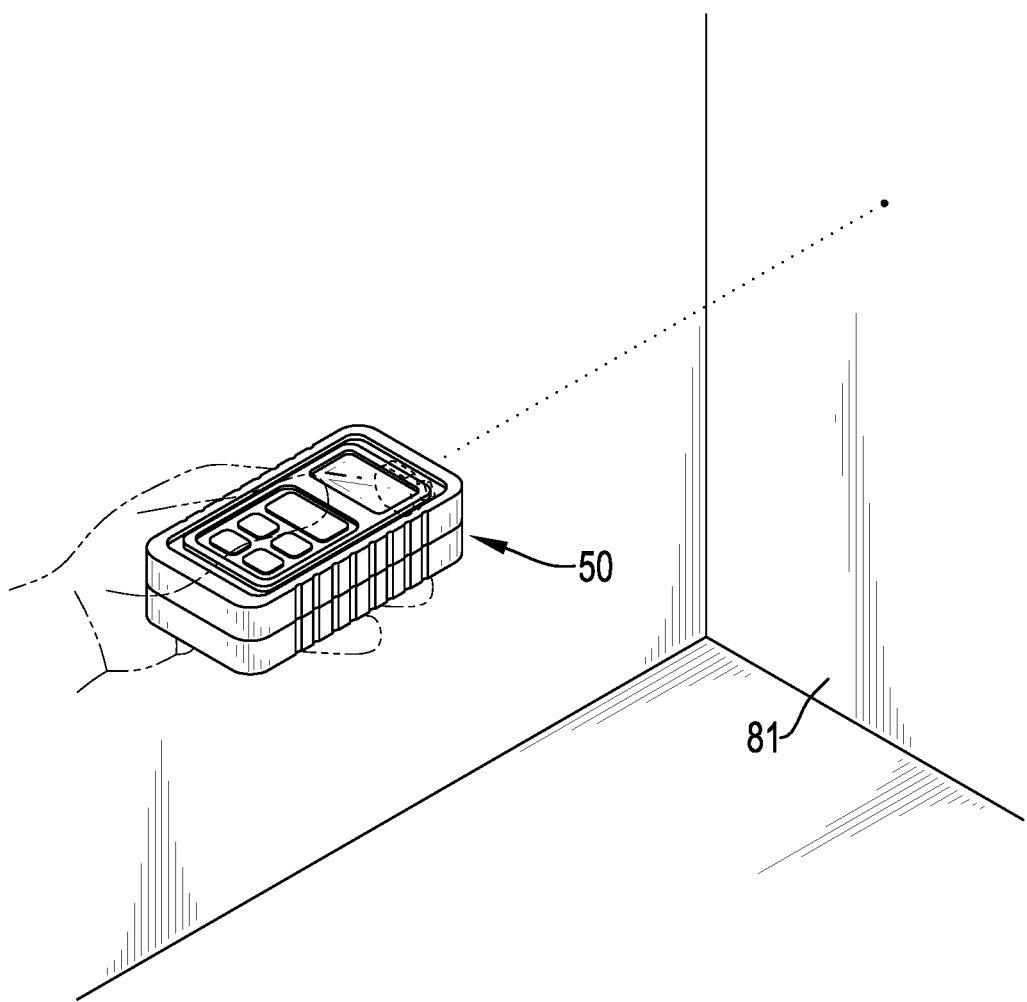
FIG. 4 is an operational schematic view of the first preferred embodiment.

With reference to FIG. 4, the ranging module 20 is electrically connected to the central processing unit 10 to detect a distance between a first target object to be measured 81 and the rangefinder. In the first preferred embodiment of the present invention, the ranging module 20 comprises a first light transmitter 21 and a first light receiver 23. The first light transmitter 21 and the first light receiver 23 are mounted at one end of the shell 50 in a lengthwise direction thereof. The first light transmitter 21 is used to emit a first detection wave to the first target object 81. The first light receiver 23 is used to receive the first detection wave reflected by the first target object 81. As an example in FIG. 4, the first target object 81 may be the ground or a wall.

The first light receiver 23 receives the first detection wave reflected by the first target object 81. The first light receiver 23 transmits a wavelength value of the reflected first detection wave to the central processing unit 10. In another embodiment, the first light receiver 23 transmits a time deviation to the central processing unit 10, wherein the time deviation represents a deviation between the time of emitting the first detection wave and the time of receiving the first detection wave reflected by the first target object 81. The central processing unit 10 compares the phase difference between the wavelengths of the emitted first detection wave and the reflected first detection wave. In another embodiment, the central processing unit 10 compares the time deviation and calculates the distance between the rangefinder and the first target object 81.

Figure 5:
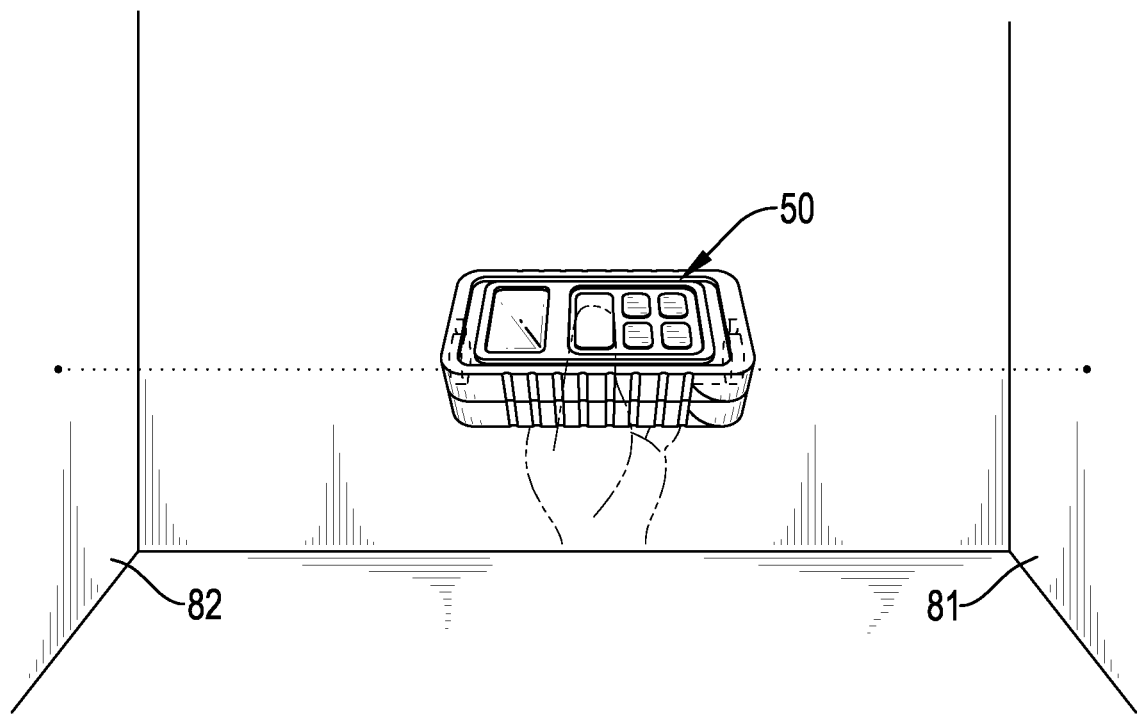
FIG. 5 is an operational schematic view of the second preferred embodiment of the present invention.

With reference to FIG. 5, in the second preferred embodiment of the present invention, the ranging module 20 further comprises a second light transmitter 25 and a second light receiver 27. The second light transmitter 25 and the second light receiver 27 are mounted at the other end of the lengthwise edge of the shell 50. The second light transmitter 25 is used to emit a second detection wave to a second target object to be measured 82. The second light receiver 27 is used to receive the second detection wave reflected by the second target object 82. The second target object 82 may be the wall opposite the first target object 81, so that the rangefinder can measure the distance between two walls opposite each other.

Similarly, the second light transmitter 25 receives the second detection wave reflected by the second target object 82. The second light receiver 27 transmits a wavelength value of the reflected second detection wave to the central processing unit 10. In another embodiment, the second light receiver 27 transmits the time deviation, wherein the time deviation represents a deviation between the time of emitting the second detection wave and the time of receiving the second detection wave reflected by the second target object 82. The central processing unit 10 compares the phase difference between the wavelengths of the emitted second detection wave and the reflected second detection wave. In another embodiment, the central processing unit 10 compares the time deviation and calculates the distance between the rangefinder and the second target object 82.

The inertial sensing unit 30 is electrically connected to the central processing unit 10 to measure the angle between the electronic automatic rangefinder and the horizontal plane. The inertial sensing unit 30 outputs the angle to the central processing unit 10. For example, when the angle between the lengthwise edge of the shell 50 and the ground is 0 degree, it represents that the electronic automatic rangefinder is parallel to the ground. When the angle between the lengthwise edge of the shell 50 and the ground is 90 degrees, it represents that the electronic automatic rangefinder is perpendicular to the ground. When the inertial sensing unit 30 detects that the angle between the electronic automatic rangefinder and the ground is 0 or 90 degrees, the central processing unit 10 determines that the electronic automatic rangefinder is parallel or perpendicular to the ground. Further, the angle between the electronic automatic rangefinder and the ground is in an angle tolerance range. For example, when the angle between the lengthwise edge of the shell 50 and the ground is in a first angle tolerance range (e.g. 0 degree±3 degrees), it represents that the electronic automatic rangefinder is parallel to the ground. When the angle between the lengthwise edge of the shell 50 and the ground is in a second angle tolerance range (e.g. 90 degrees±3 degrees), it represents that the electronic automatic rangefinder is perpendicular to the ground. In the preferred embodiment, the inertial sensing unit 30 may be a three-axis gyroscope.

The present invention may include a display unit 40. The display unit 40 is electrically connected to the central processing unit 10 to display the angle between the electronic automatic rangefinder and the ground. The user can view the angle through the display unit 40 to fine-tune the electronic automatic rangefinder until the rangefinder is perpendicular or parallel to the ground.

With reference to FIG. 2, the shell 50 covers the central processing unit 10, the ranging module 20, the inertial sensing unit 30 and the display unit 40. In the first preferred embodiment, the shell 50 can further include at least one key 51 and a first photosensitive lens 53. The at least one key 51 is electrically connected to the central processing unit 10 and can be used to set the default angle value. The first photosensitive lens 53 is mounted on one surface of the shell 50 and corresponds to the first light receiver 23. The first detection wave reflected by the first target object 81 passes through the first photosensitive lens 53 and is received by the first light receiver 23.

Figure 3:
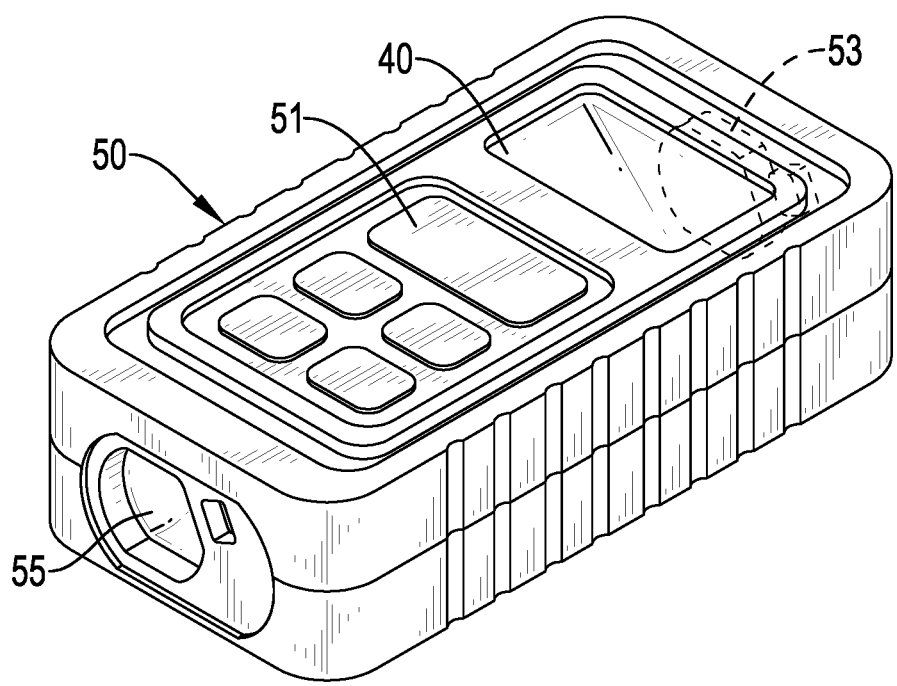
FIG. 3 is a perspective view of the second preferred embodiment of the present invention.

With reference to FIG. 3, in the second preferred embodiment, the shell 50 comprises a second photosensitive lens 55. The second photosensitive lens 55 is mounted on another surface of the shell 50 and corresponds to the second light receiver 25. The second detection wave reflected by the second target object 82 passes through the second light lens 55 and is received by the second light receiver 27. In this preferred embodiment, the first photosensitive lens 53 and the second photosensitive lens 55 are mounted on the opposite surfaces of the shell 50, so that the electronic automatic rangefinder can measure the distance between the first target object 81 and the second target object 82.

With reference to FIG. 4, when using the electronic automatic rangefinder of the present invention, the user holds the electronic automatic rangefinder and sets a default angle value. For example, when the user sets the default angle value at 0 degree, the first photosensitive lens 53 is directed toward the first target object 81. The user then slightly shakes the electronic automatic rangefinder. The rangefinder can be shortly parallel to the ground during the shaking. At the same time, the inertial sensing unit 30 measures the angle between the electronic automatic rangefinder and the ground. When the central processing unit 10 determines the angle between the electronic automatic rangefinder and the ground is 0 degree as detected by the inertial sensing unit 30, it represents that the electronic automatic rangefinder is parallel to the ground. The central processing unit 10 accordingly controls the first light transmitter 21 to transmit the first detection wave to the first target object 81. The first light receiver 23 receives the first detection wave reflected by the first target object 81. The central processing unit 10 compares the phase difference between the wavelengths of the emitted and reflected first detection waves. In another preferred embodiment, the central processing unit 10 compares the travel time difference between the emitted and reflected first detection waves. The central processing unit 10 calculates the distance between the rangefinder and the first target object 81.

With reference to FIG. 5, in the second preferred embodiment, the user also sets the default angle value at 0 degree. The first photosensitive lens 53 is directed toward the first target object 81. The second photosensitive lens 55 is directed toward the second target object 82. The user slightly shakes the electronic automatic rangefinder, allowing the electronic automatic rangefinder to be shortly parallel to the ground during the shaking. At the same time, the inertial sensing unit 30 measures the angle between the electronic automatic rangefinder and the ground. When the central processing unit 10 determines the angle between the electronic automatic rangefinder and the ground is 0 degree by means of the signal of the inertial sensing unit 30, it represents that the electronic automatic rangefinder is parallel to the ground. The central processing unit 10 controls the first light transmitter 21 to transmit the first detection wave to the first target object 81. The central processing unit 10 also controls the second light transmitter 25 to transmit the second detection wave to the second target object 82. The first light receiver 23 receives the first detection wave reflected by the first target object 81. The second light receiver 27 receives the second detection wave reflected by the second target object 82. Finally, the central processing unit 10 compares the phase difference between the wavelengths of the emitted and reflected second detection waves. Alternatively, the central processing unit 10 compares the travel time difference between the emitted and reflected first detection waves. The central processing unit 10 calculates the distance between the first target object 81 and the second target object 82.

In addition, the user can set the default angle value at 90 degrees and slightly shakes the electronic automatic rangefinder, so that the electronic automatic rangefinder can be shortly perpendicular to the ground. When the central processing unit 10 determines that the electronic automatic rangefinder is perpendicular to the ground, the central control unit 10 can control the first light transmitter 21 to transmit the first detection wave to the first target object 81. Further, the central control unit 10 can control the second light transmitter 25 to emit the second detection wave to the second target object 82. It can measure the distance between the ground and the ceiling in a vertical direction.

What is claimed is:

1. An automatic electronic rangefinder comprising:
   a shell;
   a central processing unit being in the shell and configured to determine whether the rangefinder is perpendicular or parallel to a horizontal plane;
   a ranging module being in the shell and electrically connected to the central processing unit to detect a distance relative to a first target object to be measured; and
   an inertial sensing unit being in the shell and electrically connected to the central processing unit to measure an angle between a lengthwise edge of the shell and the horizontal plane;
   wherein a photosensitive lens of the rangefinder is firstly directed toward the first target object and then the rangefinder is shaken, during which the central processing unit determines whether the rangefinder is perpendicular or parallel to the horizontal plane, and when the central processing unit determines that the rangefinder is perpendicular or parallel to the horizontal plane, the central processing unit activates the ranging module to measure a distance between the rangefinder and the first target object; and
   wherein the inertial sensing unit is a gyroscope.

2. The automatic electronic rangefinder as claimed in claim 1, wherein the ranging module includes:
   a first light transmitter to emit a first detection wave to the first target object;
   a first light receiver to receive the first detection wave reflected by the first target object;
   wherein the first light transmitter and the first light receiver are mounted at a first end of the lengthwise edge of the shell.

3. The automatic electronic rangefinder as claimed in claim 2, wherein the ranging module includes:
   a second light transmitter to emit a second detection wave to a second target object to be measured;
   a second light receiver to receive the second detection wave reflected by the second target object;
   wherein the second light transmitter and the second light receiver are mounted at a second end of the lengthwise edge of the shell.

4. The automatic electronic rangefinder as claimed in claim 3, wherein the central processing unit is configured to compare a phase difference between the first detection wave being emitted to the first target object and the first detection wave being reflected by the first target object or the central processing unit is configured to compare a time deviation; the time deviation represents a deviation between the time of emitting the first detection wave and the time of receiving the first detection wave reflected by the first target object.

5. The automatic electronic rangefinder as claimed in claim 4, wherein the central processing unit is configured to compare a phase difference between the second detection wave being emitted to the second target object and the second detection wave being reflected by the second target object or the central processing unit is configured to compare a time deviation; the time deviation represents a deviation between the time of emitting the second detection wave and the time of receiving the second detection wave reflected by the second target object.

6. The automatic electronic rangefinder as claimed in claim 5, wherein at least one key is mounted on the shell and electrically connected to the central processing unit; the at least one key is configured to permit a setting of a default angle value.

7. The automatic electronic rangefinder as claimed in claim 5, wherein at least one key is mounted on the shell and electrically connected to the central processing unit; the at least one key is configured to permit a setting of a default angle value of 0 degree.

8. The automatic electronic rangefinder as claimed in claim 5, wherein at least one key is mounted on the shell and electrically connected to the central processing unit; the at least one key is configured to permit a setting of a default angle value of 90 degrees.

9. The automatic electronic rangefinder as claimed in claim 5, wherein the central processing unit is configured to determine that the automatic electronic rangefinder is parallel to the horizontal plane when the angle between the lengthwise edge of the shell and the horizontal plane measured by the inertial sensing unit is in a first angle tolerance range.

10. The automatic electronic rangefinder as claimed in claim 5, wherein the central processing unit is configured to determine that the rangefinder is perpendicular to the horizontal plane when the angle between the lengthwise edge of the shell and the horizontal plane measured by the inertial sensing unit is in a second angle tolerance range.

11. The automatic electronic rangefinder as claimed in claim 3, wherein the central processing unit is configured to compare a phase difference between the second detection wave being emitted to the second target object and the second detection wave being reflected by the second target object or the central processing unit is configured to compare a time deviation; the time deviation represents a deviation between the time of emitting the second detection wave and the time of receiving the second detection wave reflected by the second target object.

12. The automatic electronic rangefinder as claimed in claim 11, wherein at least one key is mounted on the shell and electrically connected to the central processing unit; the at least one key is configured to permit a setting of a default angle value.

13. The automatic electronic rangefinder as claimed in claim 11, wherein at least one key is mounted on the shell and electrically connected to the central processing unit; the at least one key is configured to permit a setting of a default angle value of 0 degree.

14. The automatic electronic rangefinder as claimed in claim 11, wherein at least one key is mounted on the shell and electrically connected to the central processing unit; the at least one key is configured to permit a setting of a default angle value of 90 degrees.

15. The automatic electronic rangefinder as claimed in claim 11, wherein the central processing unit is configured to determine that the automatic electronic rangefinder is parallel to the horizontal plane when the angle between the lengthwise edge of the shell and the horizontal plane measured by the inertial sensing unit is in a first angle tolerance range.

16. The automatic electronic rangefinder as claimed in claim 11, wherein the central processing unit is configured to determine that the rangefinder is perpendicular to the horizontal plane when the angle between the lengthwise edge of the shell and the horizontal plane measured by the inertial sensing unit is in a second angle tolerance range.

17. The automatic electronic rangefinder as claimed in claim 2, wherein the central processing unit is configured to compare a phase difference between the first detection wave being emitted to the first target object and the first detection wave being reflected by the first target object or the central processing unit is configured to compare a time deviation; the time deviation represents a deviation between the time of emitting the first detection wave and the time of receiving the first detection wave reflected by the first target object.

* * * * *